United States Patent
Li-Chee-Ming et al.

(10) Patent No.: US 10,552,981 B2
(45) Date of Patent: Feb. 4, 2020

(54) DEPTH CAMERA 3D POSE ESTIMATION USING 3D CAD MODELS

(71) Applicant: SHAPETRACE INC., Toronto (CA)

(72) Inventors: Julien Li-Chee-Ming, Toronto (CA); Adil Garad, Toronto (CA); Ernest Yap, Toronto (CA); Sonal Ranjit, Toronto (CA)

(73) Assignee: SHAPETRACE INC., Toronto (CA)

( * ) Notice: Subject to any disclaimer, the term of this patent is extended or adjusted under 35 U.S.C. 154(b) by 114 days.

(21) Appl. No.: 15/872,313

(22) Filed: Jan. 16, 2018

(65) Prior Publication Data
US 2019/0221000 A1   Jul. 18, 2019

Related U.S. Application Data

(60) Provisional application No. 62/446,607, filed on Jan. 16, 2017.

(51) Int. Cl.
*G06T 7/73*   (2017.01)
*G06T 19/20*  (2011.01)

(52) U.S. Cl.
CPC .............. *G06T 7/75* (2017.01); *G06T 19/20* (2013.01); *G06T 2207/10012* (2013.01); *G06T 2207/30244* (2013.01); *G06T 2219/2004* (2013.01)

(58) Field of Classification Search
CPC . G06T 7/75; G06T 19/20; G06T 2207/30244; G06T 2219/2004; G06T 2207/10012
See application file for complete search history.

(56) References Cited

U.S. PATENT DOCUMENTS

| | | | |
|---|---|---|---|
| 6,765,569 B2 | 7/2004 | Neumann et al. | |
| 9,070,216 B2 | 6/2015 | Golparvar-Fard et al. | |
| 9,251,590 B2 | 2/2016 | Sharp et al. | |
| 9,342,928 B2 | 5/2016 | Rasane et al. | |
| 2006/0188131 A1* | 8/2006 | Zhang | G06T 7/74 382/103 |
| 2008/0310757 A1 | 12/2008 | Wolberg et al. | |
| 2009/0110267 A1* | 4/2009 | Zakhor | G06T 15/04 382/154 |
| 2011/0234759 A1* | 9/2011 | Yamaya | G06T 17/00 348/46 |
| 2012/0116728 A1 | 5/2012 | Shear et al. | |
| 2012/0194644 A1 | 8/2012 | Newcombe et al. | |
| 2012/0259594 A1 | 10/2012 | Khan et al. | |
| 2014/0206443 A1* | 7/2014 | Sharp | A63F 13/00 463/31 |
| 2014/0325414 A1 | 10/2014 | Park | |

(Continued)

FOREIGN PATENT DOCUMENTS

| | | |
|---|---|---|
| CA | 1206260 A | 6/1986 |
| CA | 2225400 A1 | 1/1997 |

(Continued)

*Primary Examiner* — Ming Y Hon
(74) *Attorney, Agent, or Firm* — Norton Rose Fulbright Canada LLP (57) ABSTRACT

Systems and methods for indoor localization in large-scale scenes, such as indoor environments are described. Systems and related methods for estimating the 3D camera pose of a depth camera by automatically aligning 3D depth images of a scene to a 3D CAD model of the scene are described.

18 Claims, 8 Drawing Sheets

(56) References Cited

U.S. PATENT DOCUMENTS

| | | | | |
|---|---|---|---|---|
| 2016/0125617 A1* | 5/2016 | Yamaguchi | ............... | G06T 7/80 382/154 |
| 2018/0061036 A1* | 3/2018 | Mostafavi | ............ | H04N 5/2226 |
| 2019/0130216 A1* | 5/2019 | Tomioka | .............. | G06K 9/6256 |
| 2019/0162534 A1* | 5/2019 | Metzler | ..................... | G06T 7/97 |
| 2019/0279383 A1* | 9/2019 | Angelova | ................. | G06T 7/55 |

FOREIGN PATENT DOCUMENTS

| | | |
|---|---|---|
| CA | 2600926 C | 6/2009 |
| CA | 2686904 A1 | 6/2011 |
| CA | 2845730 A1 | 2/2013 |
| CA | 2864003 A1 | 8/2013 |
| CA | 2843170 A1 | 8/2014 |
| CA | 2844320 A1 | 9/2014 |
| CA | 2657401 C | 6/2015 |
| CA | 2872113 A1 | 6/2015 |
| CA | 2894352 A1 | 6/2015 |
| CA | 2825834 C | 1/2018 |
| WO | 2014026021 A1 | 2/2014 |

* cited by examiner

DEPTH CAMERA 3D POSE ESTIMATION USING 3D CAD MODELS

FIELD

Embodiments generally relate to the field of indoor localization in large-scale scenes, such as indoor environments. More specifically, embodiments relate to systems and related methods for estimating the 3D camera pose of a depth camera by automatically aligning 3D depth images of a scene to a 3D CAD model of the scene.

INTRODUCTION

Applications require continuous real-time estimation of a camera's 3D position and orientation, known as camera pose, with respect to a world coordinate system. Example applications include robotic and vehicle navigation, augmented reality, and medical applications. Using surveyed targets (and setting up these targets) to photogrammetrically triangulate the camera pose can expensive, time consuming, and labour intensive. Fewer targets are required by using techniques like visual odometry and visual SLAM (simultaneous localization and mapping). These approaches estimate camera pose by tracking and triangulating natural features in the environment like points, lines, and polygons, across image sequences.

Depth cameras capture images which can be referred to herein as depth maps. In a depth map each pixel relates to relative or absolute distance from the depth camera to a point in the camera's environment. Depth information can be obtained using various techniques. For example, stereo triangulation, structured light, and time-of-flight. Depth cameras have also been used in odometry and SLAM techniques. Iterative closest point (ICP) algorithms are commonly used. Some approaches are limited in accuracy, robustness and speed.

SUMMARY

Embodiments described herein relates to systems, devices and methods for pose estimation of a depth camera. For example, depth maps captured by the camera are aligned with surfaces of a 3D CAD model of the environment in order to estimate the position and orientation of the mobile depth camera with respect to the 3D CAD model's coordinate system. An initial estimate of the mobile depth camera's pose is obtained and then the accuracy of the estimate is refined using an optimization process in real time.

Embodiments described herein relate to a method of real-time depth camera pose estimation. The method involves, at a processor, receiving a sequence of depth map frames from a moving mobile depth camera, each depth map frame comprising a plurality of image elements, each image element being associated with a depth value related to a distance from the mobile depth camera to a surface in the scene captured by the mobile depth camera. The method involves tracking a 3D position and orientation of the mobile depth camera using the depth map frames and a 3D CAD model of the environment, the 3D position and orientation defining a pose of the mobile depth camera, the tracking involving storing the 3D position and orientation of the mobile depth camera in a storage device. The method involves computing, using an initial camera pose estimate, pairs of corresponding corner features between a current depth map frame and the 3D CAD model. The current depth map frame may be captured in real time, for example. The current depth map frame may be from the sequence of depth map frames, for example. The method involves updating the initial camera pose estimate by optimizing an error metric applied to the computed corresponding corner feature points. The method involves outputting the updated camera pose estimate. For example, the method can involve reducing the error by estimating a 3D transformation that aligns the corner features extracted from the depth map frames to the corner features from the 3D CAD model.

In some embodiments, the method involves computing the corresponding corner features between the 3D CAD model and current depth map comprises: using an initial camera pose to project the current depth map onto the 3D CAD model, and identify corners in the 3D CAD model that may be in the camera's field of view, wherein a search is performed in each corner's surrounding area for the closest corner in the projected depth map.

In some embodiments, the method involves extracting corners from a 3D CAD model in an offline phase comprises: checking combinations of three planes in the 3D CAD model for a point of concurrency.

In some embodiments, corners from a depth frame are extracted by, upon a corner in the 3D CAD model appearing in the camera's field of view, performing a search in the model corner's surrounding area for a corresponding corner in the projected depth map, extracting planes from the portion of the depth map within the search area, discarding the planes that are not parallel, to within a threshold, to any of the planes of the model's corner feature.

In some embodiments, the method involves checking the combinations of three planes for a point of congruency and the method further comprises selecting the three planes whose point of intersection is closest to the model's corner.

In some embodiments, a feature for matching corners is generated by: extracting a group of four points extracted from the intersection of three planes, wherein the first point, called the origin of the corner feature, is the point of intersection of all three planes.

In some embodiments, the three lines formed by the three intersecting planes form the basis of the feature and the three other points of the corner feature are located one unit length from the origin, each along a separate basis vector.

In some embodiments, the method involves computing the initial estimate of camera pose; calculating an optimal estimate of the camera pose by minimizing or optimizing the error metric applied to the computed corresponding corner features and determining that convergence is reached; and outputting the optimal estimate of camera pose.

In some embodiments, the method involves computing pairs of corresponding corner features using the initial camera pose estimate by: receiving the initial camera pose estimate, a current depth map, and 3D CAD model corners; identifying model corners predicted to be in a field of view of the mobile depth camera; projecting the current depth map onto the 3D CAD model using the initial camera pose estimate to generate a projected depth map; for each identified model corner, searching a surrounding area for corresponding corner candidates in the projected depth map; selecting candidate corresponding corners according to a distance metric; generating four point corner features from the model and the depth map; and outputting the four point corner features.

Embodiments described herein relate to a system of real-time depth camera pose estimation comprising a persistent data store storing instructions executable by a processor to: receive a sequence of depth map frames from a moving mobile depth camera, each depth map frame comprising a plurality of image elements, each image element having a depth value being related to a distance from the mobile depth camera to a surface in the scene captured by the mobile depth camera; track a 3D position and orientation of the mobile depth camera using the depth map frames and a 3D CAD model of the environment, the 3D position and orientation defining a pose of the mobile depth camera, the tracking involving storing the 3D position and orientation of the mobile depth camera in the persistent data store; compute, use an initial camera pose estimate, pairs of corresponding corner features between a current depth map frame and the 3D CAD model; and update the estimate of the camera pose by optimizing an error metric applied to the computed corresponding corner feature points; store one or more depth map frames and the estimate of the camera pose in the persistent data store; output the estimate of the camera pose.

In some embodiments, the system involves computing the corresponding corner features between the 3D CAD model and current depth map comprises: using an initial camera pose to project the current depth map onto the 3D CAD model, and identify corners in the 3D CAD model that may be in the camera's field of view, wherein a search is performed in each corner's surrounding area for the closest corner in the projected depth map.

In some embodiments, the system involves extracting corners from a 3D CAD model in an offline phase comprises: checking combinations of three planes in the 3D CAD model for a point of concurrency.

In some embodiments, corners from a depth frame are extracted by, upon a corner in the 3D CAD model appearing in the camera's field of view, performing a search in the model corner's surrounding area for a corresponding corner in the projected depth map, extracting planes from the portion of the depth map within the search area, discarding the planes that are not parallel, to within a threshold, to any of the planes of the model's corner feature.

In some embodiments, the combinations of three planes is checked for a point of congruency and the method further comprises selecting the three planes whose point of intersection is closest to the model's corner.

In some embodiments, a feature for matching corners is generated by: extracting a group of four points extracted from the intersection of three planes, wherein the first point, called the origin of the corner feature, is the point of intersection of all three planes.

In some embodiments, the three lines formed by the three intersecting planes form the basis of the feature and the three other points of the corner feature are located one unit length from the origin, each along a separate basis vector.

In some embodiments, the system involves computing the initial estimate of camera pose; calculating an optimal estimate of the camera pose by minimizing or optimizing the error metric applied to the computed corresponding corner features and determining that convergence is reached; and outputting the optimal estimate of camera pose.

In some embodiments, computing pairs of corresponding corner features using the initial camera pose estimate involves: receiving the initial camera pose estimate, a current depth map, and 3D CAD model corners; identifying model corners predicted to be in a field of view of the mobile depth camera; projecting the current depth map onto the 3D CAD model using the initial camera pose estimate to generate a projected depth map; for each identified model corner, searching a surrounding area for corresponding corner candidates in the projected depth map; selecting candidate corresponding corners according to a distance metric; generating four point corner features from the model and the depth map; and outputting the four point corner features.

Embodiments described herein relate to a method of real-time depth camera pose estimation that involves: at a processor, forming an initial estimate of camera pose using depth map frames captured by a moving mobile depth camera; computing pairs of corresponding corner features using the initial estimate; calculating an optimal estimate of the camera pose by minimizing an error metric applied to the computed corresponding corner features; determining that convergence is reached; and outputting the optimal estimate of camera pose.

In some embodiments, each depth map frame comprises a plurality of image elements, each image element being associated with a depth value related to a distance from the mobile depth camera to a surface in the scene captured by the mobile depth camera.

Embodiments described herein relate to a method for computing pairs of corresponding corner features using an initial camera pose estimate that involves: at a processor, receiving an initial camera pose estimate, a depth map, and 3D CAD model corners; identifying model corners predicted to be in the camera's field of view; projecting the current depth map onto the 3D CAD model using the camera pose estimate; for each identified model corner, searching it surrounding area for corresponding corner candidates in the projected depth map; selecting candidate corresponding corners according to a distance metric; generating four point corner features from the model and the depth map; and outputting the four point corner features.

Many further features and combinations thereof concerning embodiments are described herein.

DESCRIPTION OF THE FIGURES

Embodiments will now be described, by way of example only, with reference to the attached figures, wherein in the figures.

DETAILED DESCRIPTION

Embodiments described herein relate to systems and methods for depth camera 3D pose estimation using 3D CAD models. The term 3D CAD model can refer to a representation of a three dimensional scene of objects and surfaces. The representation of the three dimensional scene includes detail about elements of that scene. An example 3D CAD model may be a plan or electronic drawing of the environment (e.g. room or floor of building), a 3D building information modelling (BIM) model, a map of the environment available from another source and so on.

Figure 1:
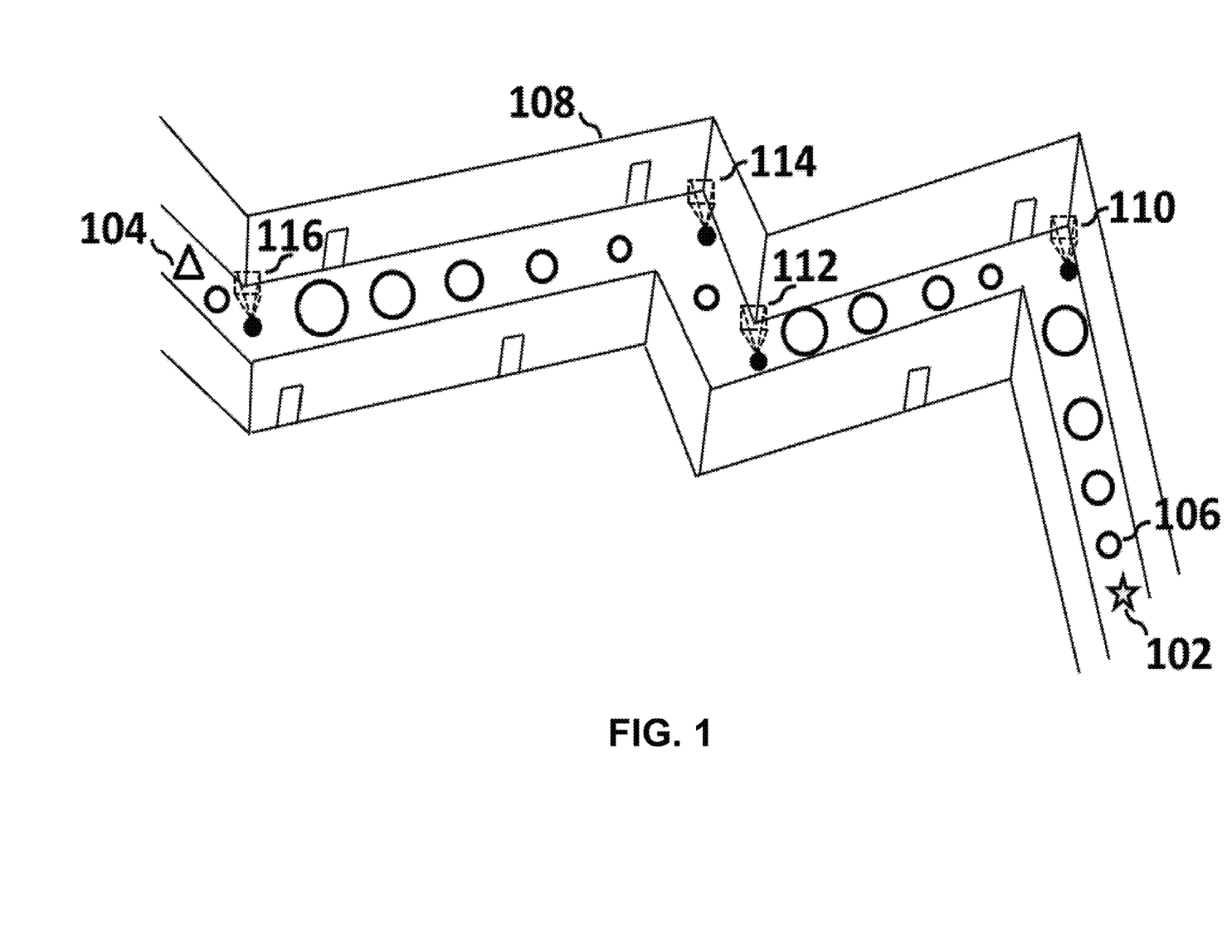
FIG. 1 is a schematic diagram of a mobile depth camera traversing a hallway.

FIG. 1 is a schematic diagram of a mobile depth camera traversing a hallway. A mobile depth camera 202 (FIG. 2) is operable to move and traverse a hallway 108 from a start position or location 102 to an end position or location 104 along a route or trajectory of intermediate positions or locations 106. The diagram depicts depth maps with corner features 110, 112, 114, 116. A mobile depth camera 202 can couple to wheels, pistons, motors, valves, actuators, and other movement mechanisms to order to move. For example, the mobile depth camera 202 can be integrated as a part of a mobile robot that can actuate components to spin wheels and pivot jointed segments. Actuators can include electronic motors, mechanical components, hydraulic systems, pneumatic systems, and so on.

Figure 2:
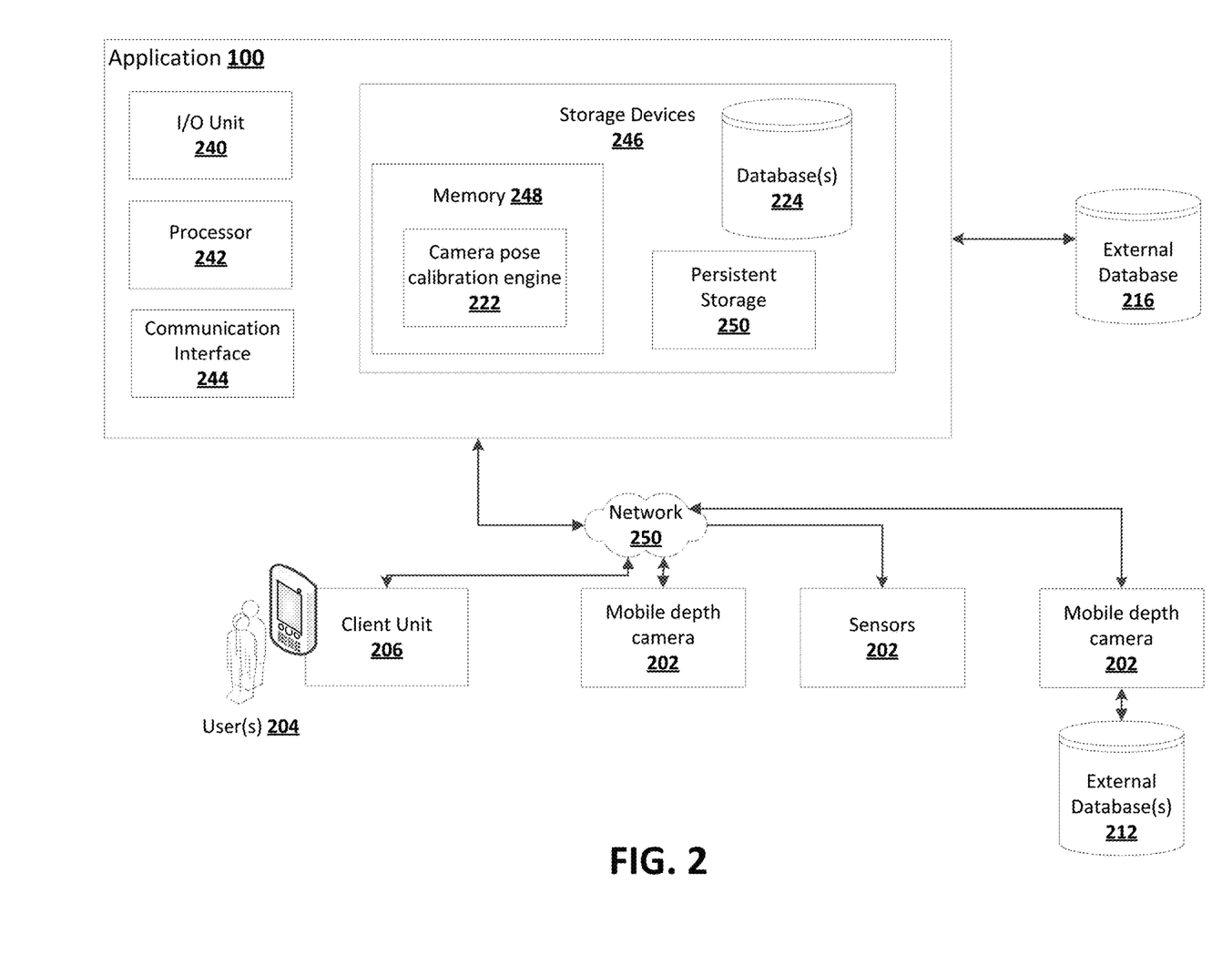
FIG. 2 is a schematic diagram of a system for depth camera 3D pose estimation using 3D cad models according to some embodiments.

FIG. 2 is a schematic diagram of a system for depth camera 3D pose estimation using 3D CAD models according to some embodiments. Application 100 can refer to a computer controller, for example, that can drive a motor, activate a circuit or manipulate an actuator. Application 100 can connect to mobile depth camera 202 via network 250, may be integrated as part of the mobile depth camera 202, or may be integrated with a robotics component, for example. The depth camera 202 captures sequences of depth images of a scene. Each depth image or depth map frame comprises a two dimensional image in which each image element, or pixel, comprises a depth value. The depth value can be a distance from the camera 202 to an object in the camera's field of view. This depth value may be an absolute value provided in specified units of measurement such as meters, or inches or may be a relative depth value. In some cases the depth value may be a disparity value, for example generated by stereo cameras. In each captured depth image there may be around 300,000 or more pixels each having a depth value. The frame rate is high enough to enable the depth images to be used for robotics, mobile applications, or other applications. For example, at least 30 frames per second.

Application 100 can include an I/O Unit 240, processor 242, communication interface 244, and storage devices 246. Application 100 can connect with one or more client units 206 (with interface applications), depth cameras 202, and/or databases 212. This connection may be over a network 250 (or multiple networks). depth camera 202 receives and transmits data from one or more of these via I/O unit 240. When data is received, I/O unit 240 transmits the data to processor 242. Depth cameras 202 can refer to one or more sensors, for example, to capture image data and other data. The depth cameras 202 can add timestamps to image data using an internal or external clock, for example, and can generate a sequence of frames.

Each I/O unit 240 can enable the application 100 to interconnect with one or more input devices, such as a keyboard, mouse, camera, touch screen and a microphone, and/or with one or more output devices such as a display screen and a speaker.

A processor 242 can execute instructions in memory 248 to configure camera pose calibration engine 222. A processor 242 can be, for example, any type of general-purpose microprocessor or microcontroller, a digital signal processing (DSP) processor, an integrated circuit, a field programmable gate array (FPGA), a reconfigurable processor, or any combination thereof.

Memory 248 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 246 can include memory 248, databases 224, and persistent storage 250.

Each communication interface 244 can enable the application 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The application 100 can be operable to register and authenticate users (using a login, unique identifier, and password for example) prior to providing access to applications, a local network, network resources, other networks and network security devices. The application 100 may serve one user or multiple users.

The storage devices 246 may be configured to store information associated with or created by the camera pose calibration engine 222. Storage devices 246 and/or persistent storage 250 may be provided using various types of storage technologies, such as solid state drives, hard disk drives, flash memory, and may be stored in various formats, such as relational databases, non-relational databases, flat files, spreadsheets, extended markup files, etc.

The camera pose calibration engine 222 derives a pose estimate of the camera 202 according to some embodiments. A camera 202 pose derived from a visual odometry or SLAM system has an error that drifts, that is, grows without bound. In an example the pose is estimated by a visual-inertial SLAM system, where drift-free camera roll and pitch estimates are provided by an INS (inertial navigation system), also called an AHRS (attitude and heading reference system). The four other camera pose parameters, i.e. 3D position and heading, are subject to drift. Embodiments described herein can be applied in this example.

Each frame's estimated position is shown using a circle (i.e. 106). The camera pose's accuracy is symbolized by the circle's radius. The error is reduced by the camera pose calibration engine 222. The camera pose calibration engine 222 identifies corner features 110, 112, 114, 116 in the depth map that matches corners features in the 3D CAD model. The error is reduced by estimating the 3D transformation that aligns the corner features extracted from the depth map to the corner features from the 3D CAD model.

In some examples this 3D transformation is expressed as a six degree of freedom camera pose estimate in the form of an $SE_3$ matrix describing the rotation and translation of the depth camera relative to the world coordinate system. This transformation matrix can be expressed as:

$$T_k = \begin{bmatrix} R_k & t_k \\ 0 & 1 \end{bmatrix} \in SE_3$$

Where $T_k$ is the transformation matrix for depth image frame k, $R_k$ is the camera rotation for frame k, $t_k$ is the camera translation at frame k, and Euclidean group:

$$SE_3:=\{R,t|R\in SO_3, t\in R^3\}$$

Coordinates in the depth camera's coordinate system can be mapped to real world coordinates by multiplying by this transformation matrix. These camera pose parameters are output by the camera pose calibration engine 222 to produce a real-time series of 6 degree of freedom pose estimates of the depth camera.

Figure 3:
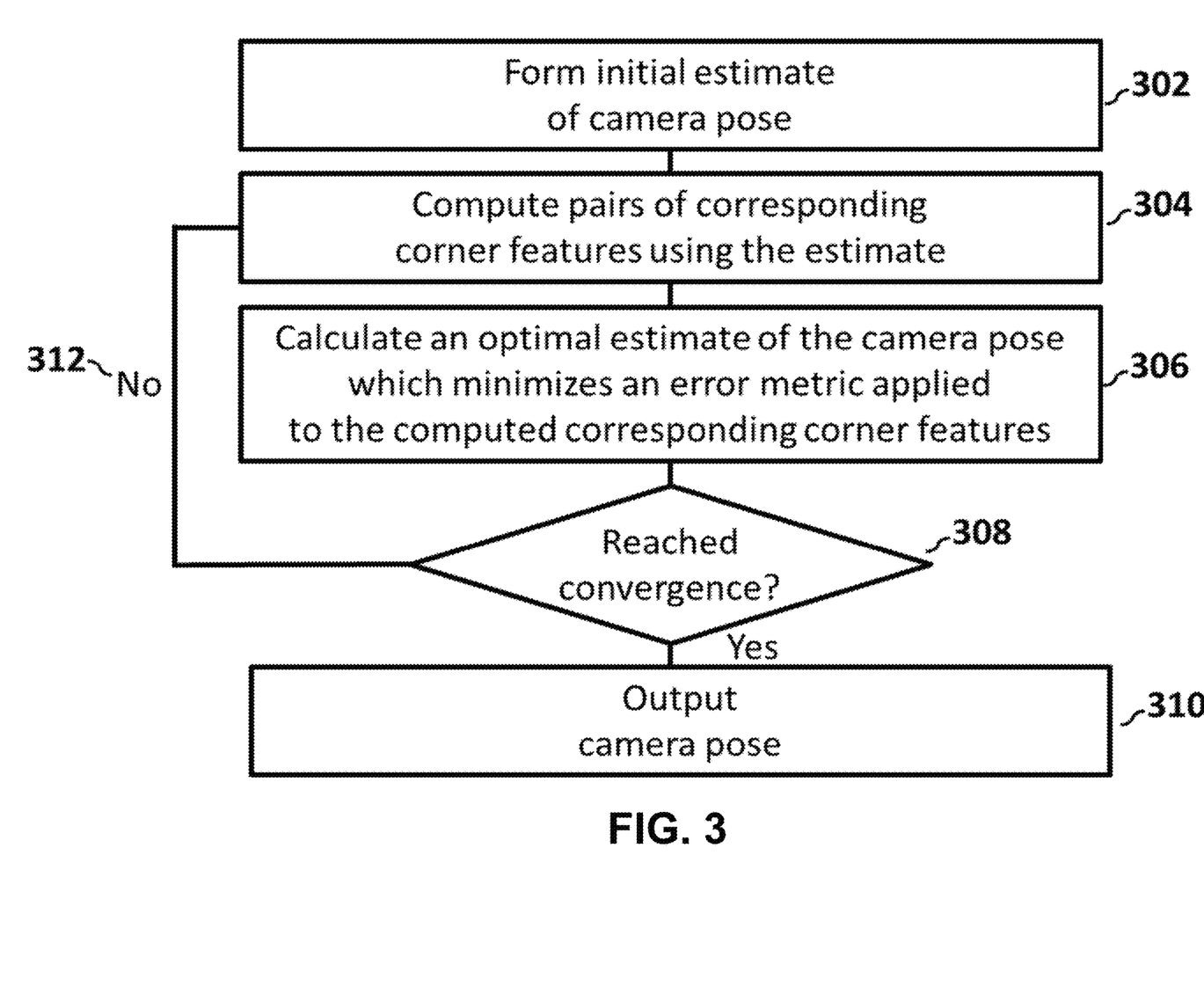
FIG. 3 is a work flow diagram of the camera pose calibration engine according to some embodiments.

FIG. 3 is a flow diagram of the camera pose calibration engine 222. At 302, of the camera pose calibration engine 222 derives or forms an initial estimate of the camera pose. These are the registration parameters of a transform for aligning the current depth frame to the world coordinate system. The initial estimate could come from one or more of the following: GPS/GNSS output, inertial navigation system, visual odometry, SLAM system. In another example, the initial estimate is formed by predicting where the camera is using information about the previous pose estimates of the camera. For example, the camera may be assumed to have a constant velocity or a constant acceleration. The trajectory of the camera 202 from time 0 to time t-1 may be used to predict where the camera will be at time t and thus obtain an initial camera pose estimate.

At 304, of the camera pose calibration engine 222 computes pairs of corresponding corner features using the initial estimate of the camera pose. That is, using the initial camera pose estimate, corner features are extracted from the current depth map and matched with corner features extracted from the 3D CAD model. A pair of corresponding corner features is a corner feature from one depth map and a corner feature from a 3D CAD model 108.

Once pairs of corresponding corner features have been identified (at 304), at 306, the camera pose calibration engine 222 calculates an updated estimate of the camera pose which optimizes an error metric applied to the computed corresponding corner feature points. At 308, a check is made to assess whether convergence has been reached. If convergence is reached, there is little or no change in the updated estimate and the camera pose is output at 310. If not, the iterative process repeats at 312 by returning to compute pairs of corresponding corner features at 304.

Figure 4:
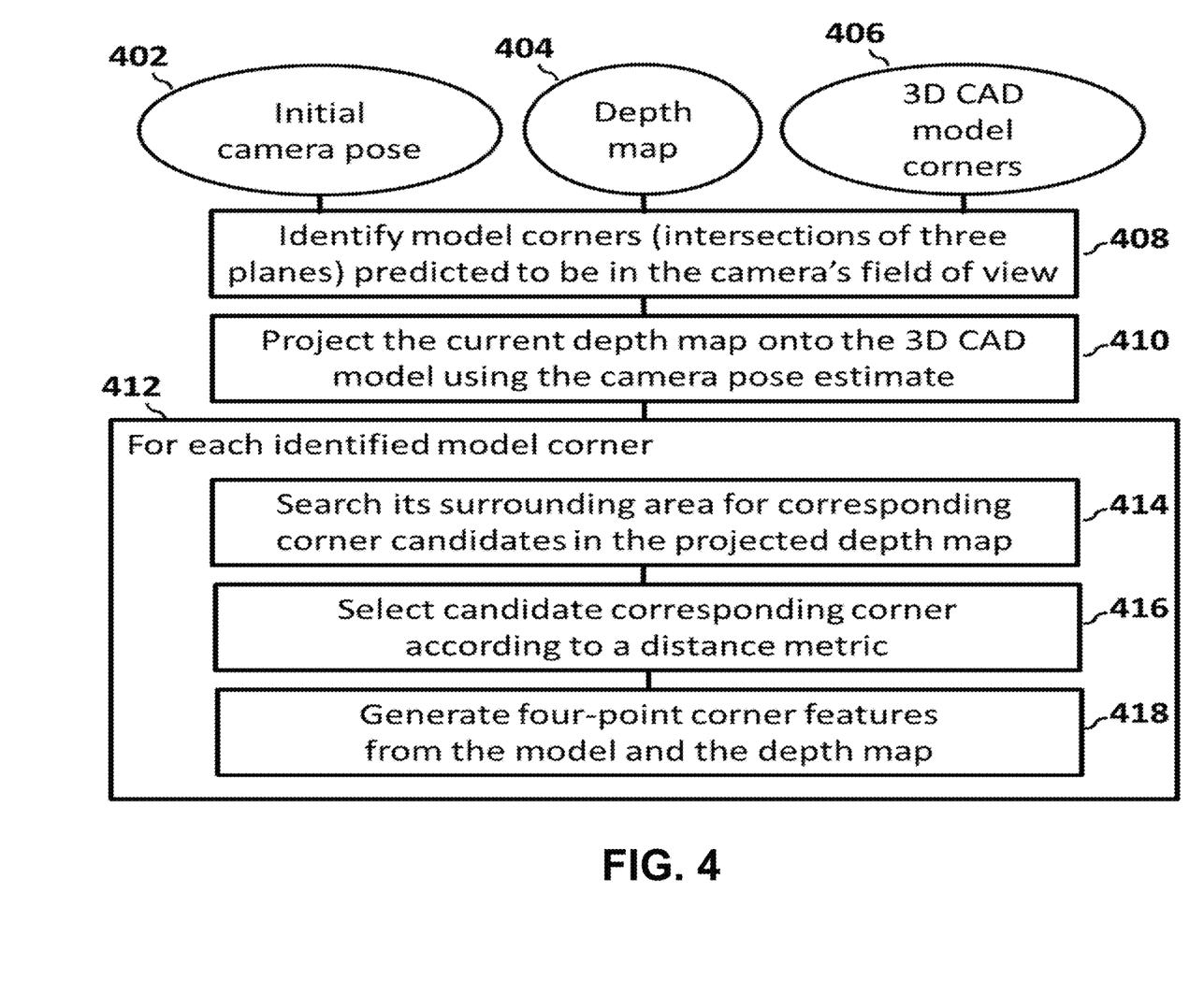
FIG. 4 is a work flow diagram of a method for computing pairs of corresponding corner features using an initial camera pose estimate according to some embodiments.

Further detail about how the corresponding points are computed 304 is provided with reference to FIG. 4 which is a diagram of a method for computing pairs of corresponding corner features using an initial camera pose estimate. The method receives as input an initial camera pose 402, depth map 404, and the 3D CAD model 406. At 408, the initial camera pose 402 is used to project the current depth map 404 onto the 3D CAD model 406. The initial camera pose 402 is also used to identify corners in the 3D CAD model 406 that may be in the camera's field of view. At 410, the camera pose calibration engine 222 projects the current depth map 404 onto the 3D CAD model 406 using the camera pose estimate 402. For each identified model corner (412), the camera pose calibration engine 222, at 414, performs a search in each model corner's surrounding area for a corresponding corner in the projected 410 depth map. One or more candidate corresponding corners may be found as a result of this search. From those candidate corresponding corners, a single corner is selected to form a pair with the 3D CAD model corner. At 416, the camera pose calibration engine 222 makes a selection on the basis of a distance metric. For example, a Euclidean distance is calculated between the model corner feature 504 points and the candidate corresponding corner feature 520 extracted from the depth map. The pair which gives the smallest Euclidean distance is then selected. At 418, the camera pose calibration engine 222 generates four point corner features from the 3D CAD model 406 and the depth map 404.

Figure 5:
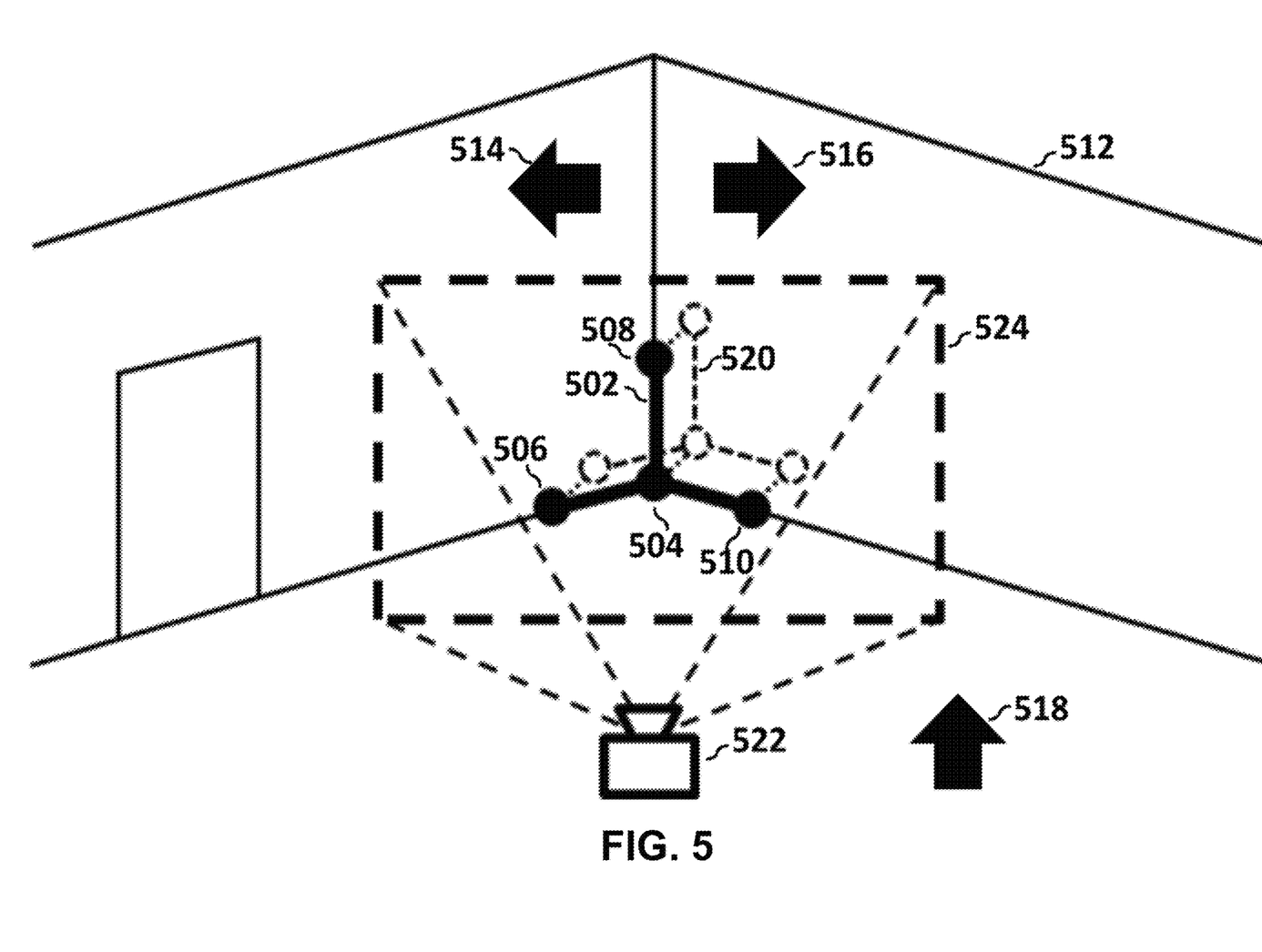
FIG. 5 is a schematic diagram of a corner feature.

FIG. 5 is a schematic diagram of a data structure or visual representation illustrating an environment 512 with a corner feature 502. A corner feature 502 is a group of four points 504, 506, 508, 510 extracted from the intersection of three planes 514, 516, 518. The first point 504, called the origin of the corner feature, is the point of intersection of all three planes. The three lines formed by the three intersecting planes form the basis of the feature. The three other points 506, 508, 510 of the corner feature 502 are located, for example, one unit length from the origin point 504, each along a separate basis vector. A depth camera 522 is shown along with its corresponding depth map 524 that includes the corner feature 520.

Figure 6:
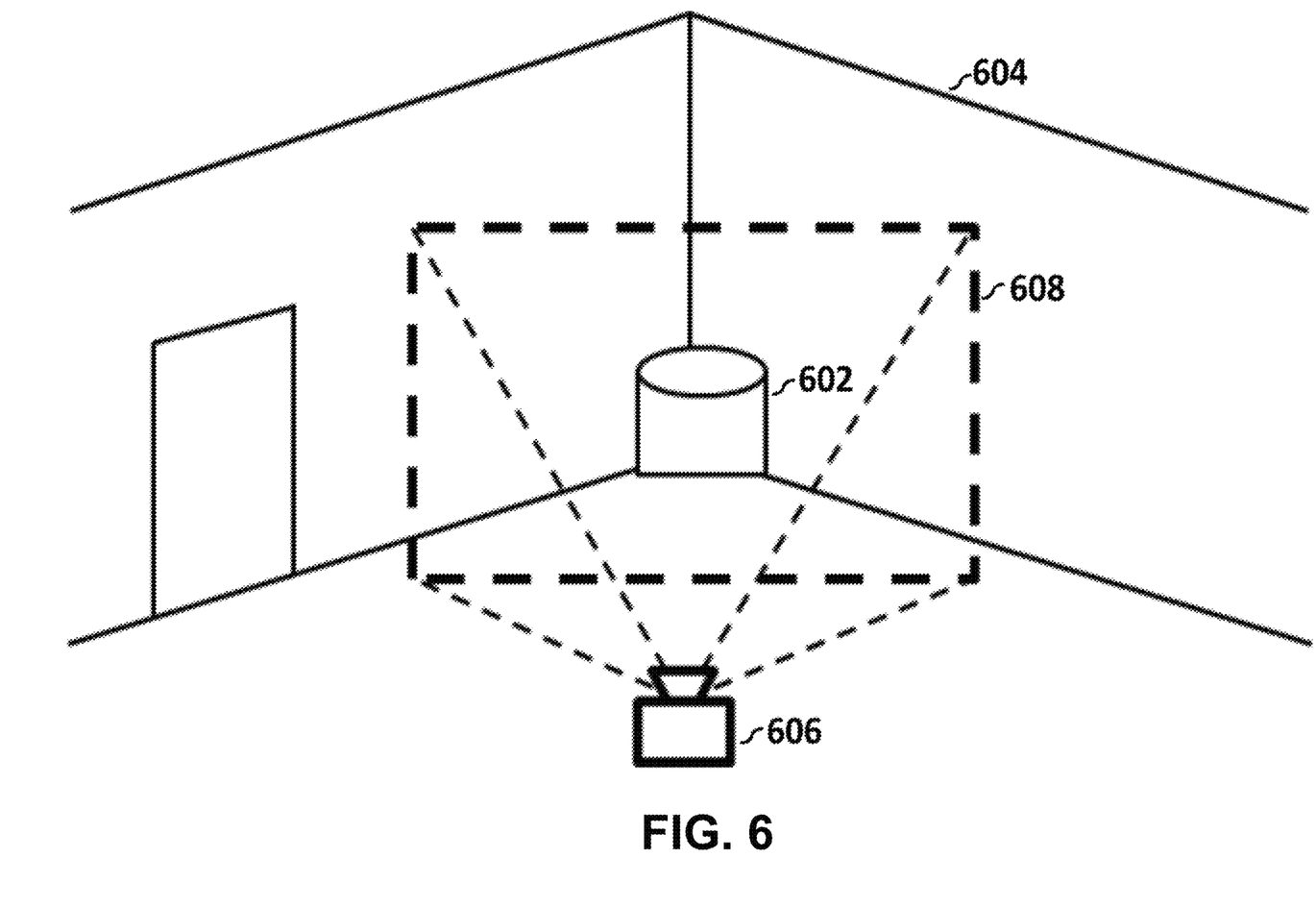
FIG. 6 is a schematic diagram of an occluded corner.

FIG. 6 is a schematic diagram of a data structure or visual representation illustrating an environment 604 with a corner that is occluded by an object 602 in the environment so the corner feature's origin cannot be directly extracted from the camera's 606 depth map 608.

Figure 7:
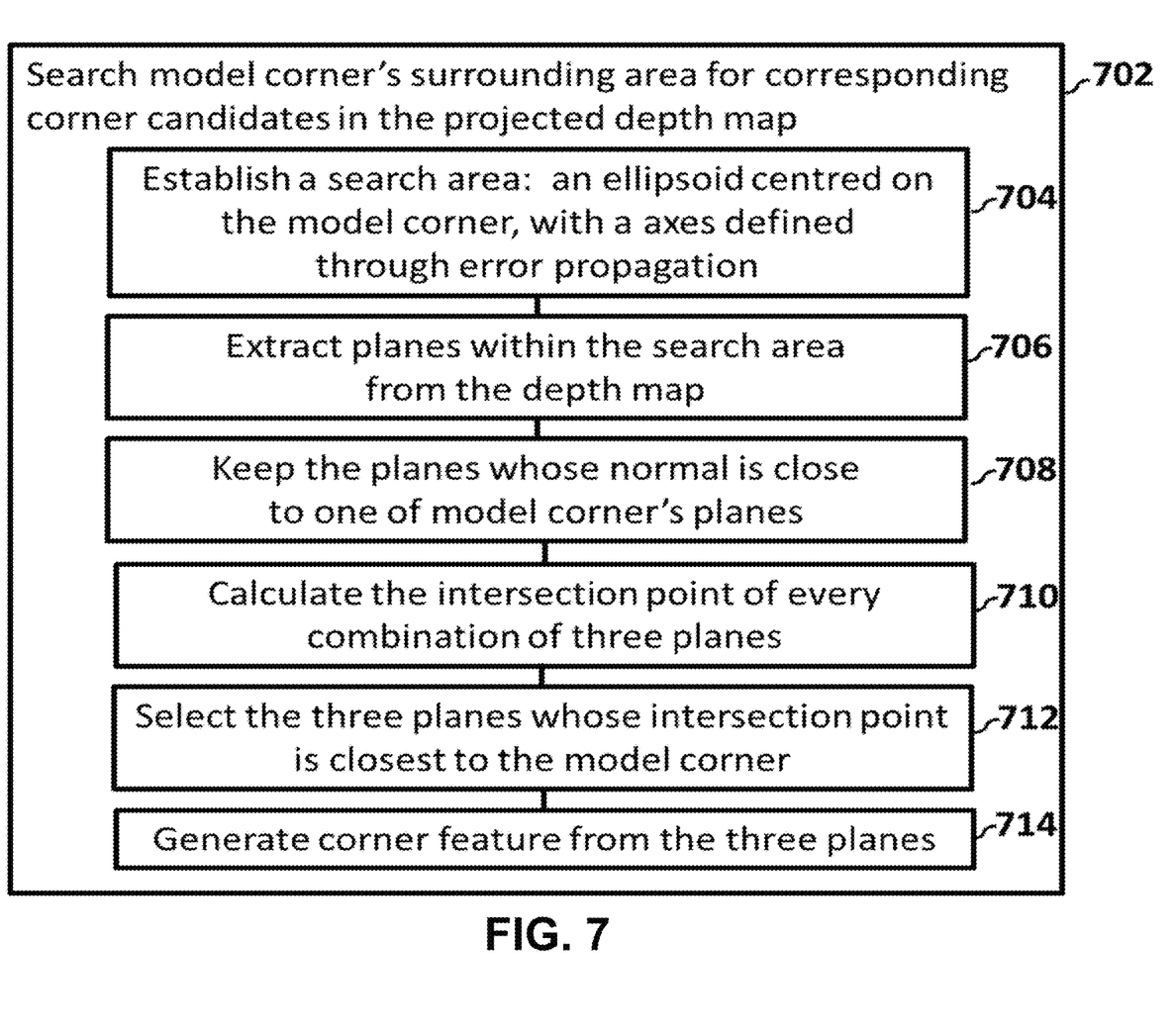
FIG. 7 is a workflow diagram for finding corresponding corner feature's in a depth frame for a given model corner feature.

FIG. 7 as a flowchart diagram of a method 702 for finding corresponding corner feature's in a depth frame for a given model corner feature. The method 702 can be used to extract corner feature's origin from the depth map 608, whether or not the corner is occluded.

In an offline phase, the 3D CAD model 512 is processed to extract all of the corner features 502 from the 3D CAD model. In an example, this is done by checking every combination of three planes in the 3D CAD model 512 for a point of concurrency. The normals 514, 516, 518 of the planes are processed using Cramer's rule for example.

Figure 8:
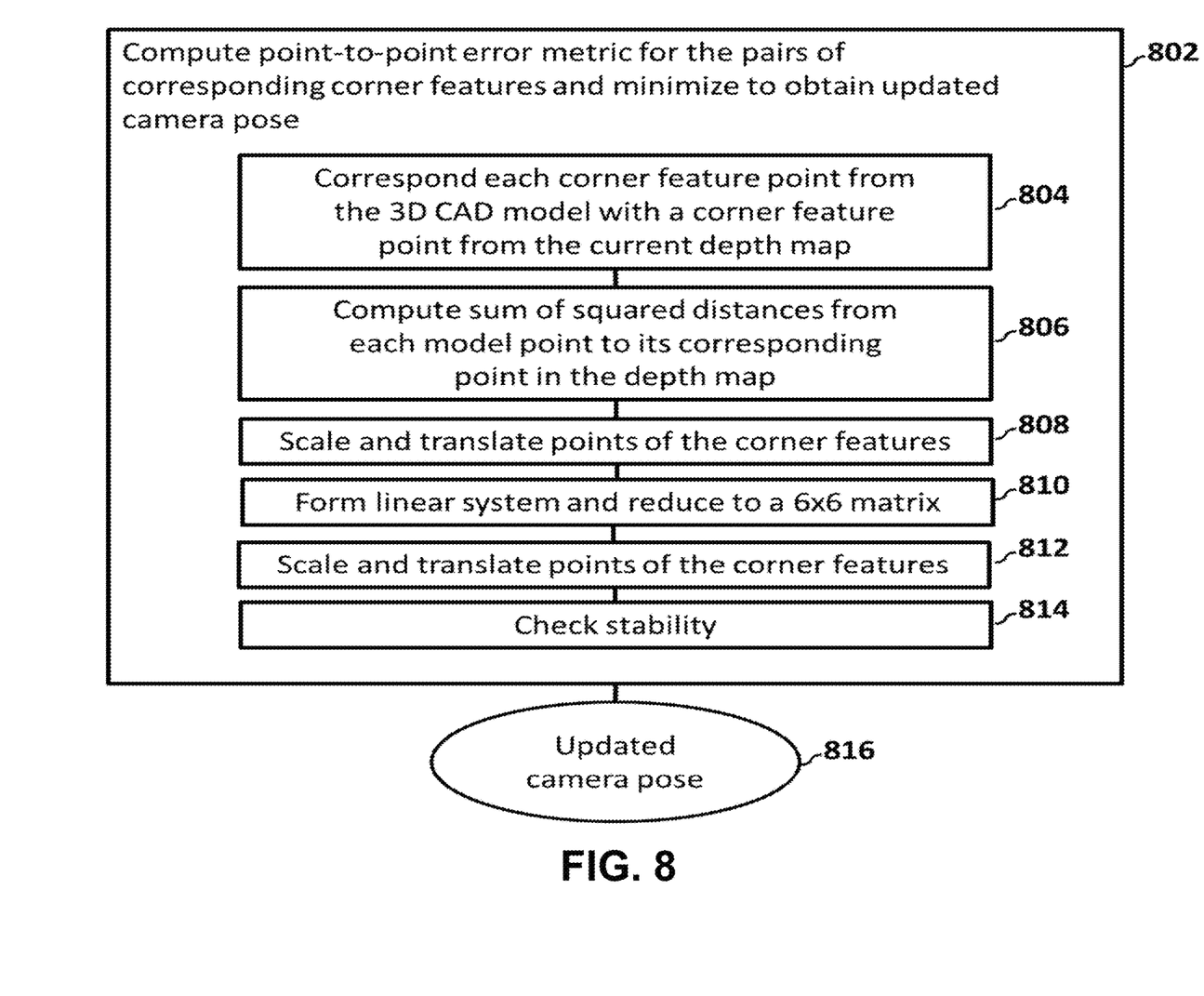
FIG. 8 is a workflow diagram for computing and minimizing a point-to-point error metric for pairs of corresponding corner features to estimate camera pose.

Once a corner feature in the 3D CAD model appears in the camera's 522 field of view 524, at 702, a search is performed in the model corner's 502 surrounding area for a corresponding corner feature 520 in the depth map projected into the world (i.e. 3D CAD model) coordinate system using the camera's 522 initial camera pose estimate. At 704, a search area is established. The surrounding area may be for example an ellipsoid, centered on the model corner, whose axes are determined by propagating the error from the initial camera pose estimate and the accuracy of the depth sensor measurements. At 706, planes are extracted from the portion of the depth map within the search area. At 708, the extracted planes that are not parallel, to within a threshold, to any of the planes of the model's corner feature are discarded. At 710, every combination of three planes is checked to see if they intersect at one point, using Cramer's rule for example. At 712, the three planes whose intersection point is closest to the model corner is selected. At 714, a corner feature from the three planes is generated. The three planes whose point of intersection is closest to the model's corner 502 are used to generate the corresponding corner feature 520. If a corner feature is not found within the search area of the depth map, the corner may be occluded by an object 602. In this case, the search area may be extended, for example to the entire depth map 608 in the worst case scenario. FIG. 8 is a flowchart diagram of a method 802 for computing and minimizing a point-to-point error metric for pairs of corresponding corner features to estimate camera pose.

In an example a point-to-point error metric is computed at 802 for the pairs of corresponding corner features and this metric is optimized to obtain updated camera pose. This process is designed to be implemented using at least one parallel computing unit such as a GPU in order to obtain real-time processing as now described. At 804, each corner feature point from the 3D CAD model is associated with a corner feature point from the current depth map. The point-to-point error metric can be computed as a sum of squared distances at 806 from each point 504, 506, 508, 510 of the 3D CAD model's corner feature 502 to its corresponding point of the corner feature 520 in the depth map at 804. The process attempts to optimize this metric to find an updated set of camera pose parameters.

In some embodiments, the pairs of corresponding points may be scaled and translated at 808. For example by normalizing the coordinates or removing the centroid. This may improve the stability of the optimization process.

For each pair of corresponding points a linear system comprising a system of equations is formed on a parallel computing unit in order to optimize the error metric using numerical least squares optimization. The optimization may use any suitable optimization process such as a Gauss-Newton method, a gradient descent method, a limited memory Broyden-Fletcher-Goldfarb-Shanno (LBFGS) method, and a Levenberg-Marquardt method. Each linear system may be in the form of a 6 by 6 matrix at 810. The plurality of matrices may be reduced to a single 6 by 6 matrix on the parallel computing unit.

The single 6 by 6 matrix is solved to find updated camera pose parameters. The solution is scaled and translated back to the original scaling and translation at 812. The stability of the solution is checked at 814 and the updated camera pose parameters are output at 816 by the process 802.

In an example, the following point-to-point error metric is used although this is not essential; other error metrics, such as point-to-line, line-to-line, or plane-to-plane, may also be used:

$$\mathrm{argmin}_{T_k \in SE_3} \sum_{u \in U} (T_k v_k(u) - \hat{v}^w(j))^2$$

This error metric may be used to obtain a new transformation $T_k$. The current frame k of the depth camera $D_k$ provides depth measurements $d=D_k(u)$ at image pixel $u=(x, y)$ in the image domain $u \varepsilon$ U. These measurements may be expressed in the camera's coordinate system as $v_k(u)=[x_d, y_d, d, 1]$. The SE3 transformation matrix transforms the camera coordinate system at time k into the world coordinate system as $v_k^w(u)=T_k v_k(u)$. The point from the 3D CAD model is the corresponding corner feature point of $v_k^w(u)$.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

The application 100 connects to other components in various ways including directly coupled and indirectly coupled via the network 250. Network 250 (or multiple networks) is capable of carrying data. Network 250 can involve wired connections, wireless connections, or a combination thereof.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Embodiments may involve servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The application 100 can be implemented by a computing device with at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

An I/O interface enables computing device to interconnect with one or more input devices, such as a keyboard, mouse, camera, touch screen and a microphone, or with one or more output devices such as a display screen and a speaker.

A communication interface enables computing device to communicate with other components, to exchange data with other components, to access and connect to network resources, to serve applications, and perform other computing applications by connecting to a network (or multiple networks) capable of carrying data.

Computing device is operable to register and authenticate users (using a login, unique identifier, and password for example) prior to providing access to applications, a local network, network resources, other networks and network security devices. Computing devices may serve one user or multiple users.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the features described above are illustrative examples

What is claimed is:

1. A method of real-time depth camera pose estimation comprising:
   at a processor,
   receiving a sequence of depth map frames from a moving mobile depth camera, each depth map frame comprising a plurality of image elements, each image element being associated with a depth value related to a distance from the mobile depth camera to a surface in the scene captured by the mobile depth camera;
   tracking a 3D position and orientation of the mobile depth camera using the depth map frames and a 3D CAD model of the environment, the 3D position and orientation defining a pose of the mobile depth camera, the tracking involving storing the 3D position and orientation of the mobile depth camera in a storage device;
   computing, using an initial camera pose estimate, pairs of corresponding corner features between a current depth map frame and the 3D CAD model;
   updating the initial camera pose estimate by optimizing an error metric applied to the computed corresponding corner feature pairs;
   outputting the updated camera pose estimate; and
   wherein computing pairs of corresponding corner features using the initial camera pose estimate comprises:
      receiving the initial camera pose estimate, a current depth map, and 3D CAD model corners;
      identifying model corners predicted to be in a field of view of the mobile depth camera;
      projecting the current depth map onto the 3D CAD model using the initial camera pose estimate to generate a projected depth map;
      for each identified model corner,
         searching a surrounding area for corresponding corner candidates in the projected death map;
         selecting candidate corresponding corners according to a distance metric;
      generating four point corner features from the model and the depth map; and
      outputting the four point corner features.

2. The method of claim 1 wherein computing the corresponding corner features between the 3D CAD model and current depth map comprises: using an initial camera pose to project the current depth map onto the 3D CAD model, and identify corners in the 3D CAD model that may be in the camera's field of view, wherein a search is performed in each corner's surrounding area for the closest corner in the projected depth map.

3. The method of claim 2 wherein extracting at least one of the corner features from the 3D CAD model in an offline phase comprises: checking combinations of three planes in the 3D CAD model for a point of concurrency.

4. The method of claim 2 wherein at least one of the corner features from a depth frame is extracted by, upon a corner in the 3D CAD model appearing in the camera's field of view, performing a search in the model corner's surrounding area for a corresponding corner in the projected depth map, extracting planes from the portion of the depth map within the search area, discarding the planes that are not parallel, to within a threshold, to any of the planes of the model's corner feature.

5. The method of claim 4 wherein the combinations of three planes is checked for a point of congruency and the method further comprises selecting the three planes whose point of intersection is closest to the model's corner.

6. The method of claim 2 wherein at least one of the corner features is generated by: extracting a group of four points extracted from the intersection of three planes, wherein the first point, defined as an origin of the corner feature, is the point of intersection of all three planes.

7. The method of claim 6 wherein the three lines formed by the three intersecting planes form the basis of the corner feature and the three other points of the corner feature are located one unit length from the origin, each along a separate basis vector.

8. The method of claim 1 further comprising:
   computing the initial estimate of camera pose;
   calculating an optimal estimate of the camera pose by minimizing or optimizing the error metric applied to the computed corresponding corner features and determining that convergence is reached; and
   outputting the optimal estimate of camera pose.

9. A system of real-time depth camera pose estimation comprising a persistent data store storing instructions executable by a processor to:
   receive a sequence of depth map frames from a moving mobile depth camera, each depth map frame comprising a plurality of image elements, each image element having a depth value being related to a distance from the mobile depth camera to a surface in the scene captured by the mobile depth camera;
   track a 3D position and orientation of the mobile depth camera using the depth map frames and a 3D CAD model of the environment, the 3D position and orientation defining a pose of the mobile depth camera, the tracking involving storing the 3D position and orientation of the mobile depth camera in the persistent data store;
   compute, using an initial camera pose estimate, pairs of corresponding corner features between a current depth map frame and the 3D CAD model; and
   update the estimate of the camera pose by optimizing an error metric applied to the computed corresponding corner feature points;

store one or more depth map frames and the estimate of the camera pose in the persistent data store;
output the estimate of the camera pose; and
wherein to compute pairs of corresponding corner features using the initial camera pose estimate, the system instructs the processor to:
receive the initial camera pose estimate, a current depth map, and 3D CAD model corners;
identify model corners predicted to be in a field of view of the mobile depth camera;
project the current depth mad onto the 3D CAD model using the initial camera pose estimate to generate a projected depth map;
for each identified model corner,
search a surrounding area for corresponding corner candidates in the projected depth select candidate corresponding corners according to a distance metric;
generate four point corner features from the model and the depth map; and
output the four point corner features.

10. The system of claim 9, wherein computing the corresponding corner features between the 3D CAD model and current depth map comprises: using an initial camera pose to project the current depth map onto the 3D CAD model, and identify corners in the 3D CAD model that may be in the camera's field of view, wherein a search is performed in each corner's surrounding area for the closest corner in the projected depth map.

11. The system of claim 10 wherein extracting at least one of the corner features from the 3D CAD model in an offline phase comprises: checking combinations of three planes in the 3D CAD model for a point of concurrency.

12. The system of claim 10 wherein at least one of the corner features from a depth frame is extracted by, upon a corner in the 3D CAD model appearing in the camera's field of view, performing a search in the model corner's surrounding area for a corresponding corner in the projected depth map, extracting planes from the portion of the depth map within the search area, discarding the planes that are not parallel, to within a threshold, to any of the planes of the model's corner feature.

13. The system of claim 12 wherein the combinations of three planes is checked for a point of congruency and the instructions, when executed by the processor, configure the processor to select the three planes whose point of intersection is closest to the model's corner.

14. The system of claim 10 wherein at least one of the corner features is generated by: extracting a group of four points extracted from the intersection of three planes, wherein the first point, called the origin of the corner feature, is the point of intersection of all three planes.

15. The system of claim 14 wherein the three lines formed by the three intersecting planes form the basis of the feature and the three other points of the corner feature are located one unit length from the origin, each along a separate basis vector.

16. The system of claim 9 further comprising a persistent data store storing instructions executable by a processor to:
compute the initial estimate of camera pose;
calculate an optimal estimate of the camera pose by minimizing or optimizing the error metric applied to the computed corresponding corner features and determining that convergence is reached; and
output the optimal estimate of camera pose.

17. A non-transitory computer-readable storage medium comprising computer-executable instructions for causing a processor to compute real-time depth camera pose estimations by:
storing a 3D position and orientation of a mobile depth camera using death map frames and a 3D CAD model of the environment, the 3D position and orientation defining a pose of the mobile depth camera;
forming an initial estimate of camera pose using depth map frames captured by fall the moving mobile depth camera;
computing pairs of corresponding corner features using the initial estimate;
calculating an optimal estimate of the camera pose by minimizing an error metric applied to the computed corresponding corner features;
determining that convergence is reached;
outputting the optimal estimate of camera pose; and
wherein the computing of the pairs of corresponding corner features using the initial camera pose estimate comprises:
receiving the initial camera pose estimate, a current depth map, and 3D CAD model corners;
identifying model corners predicted to be in a field of view of the mobile death camera;
projecting the current death map onto the 3D CAD model using the initial camera pose estimate to generate a projected death map;
for each identified model corner,
searching a surrounding area for corresponding corner candidates in the projected death map:
selecting candidate corresponding corners according to a distance metric;
generating four point corner features from the model and the death map; and
outputting the four point corner features.

18. The non-transitory computer-readable storage medium of claim 17 wherein each depth map frame comprises a plurality of image elements, each image element being associated with a depth value related to a distance from the mobile depth camera to a surface in the scene captured by the mobile depth camera.

* * * * *

UNITED STATES PATENT AND TRADEMARK OFFICE
CERTIFICATE OF CORRECTION

PATENT NO. : 10,552,981 B2  
APPLICATION NO. : 15/872313  
DATED : February 4, 2020  
INVENTOR(S) : Julien Li-Chee-Ming et al.

Page 1 of 1

It is certified that error appears in the above-identified patent and that said Letters Patent is hereby corrected as shown below:

In the Claims

Column 11, Lines 64 - 65 (Claim 1):
"searching a surrounding area for corresponding corner candidates in the projected death map"
Should read:
-- searching a surrounding area for corresponding corner candidates in the projected depth map --

Column 14, Line 17 (Claim 17):
"...storing a 3D position and orientation of a mobile depth camera using death map frames..."
Should read:
-- ...storing a 3D position and orientation of a mobile depth camera using depth map frames... --

Column 14, Lines 35 - 47 (Claim 17):
"identifying model corners predicted to be in a field of view of the mobile death camera;
projecting the current death map onto the 3D CAD model using the initial camera pose estimate to generate a projected death map;
for each identified model corner, searching a surrounding area for corresponding corner candidates in the projected death map;
selecting candidate corresponding corners according to a distance metric;
generating four point corner features from the model and the death map; and
outputting the four point corner features."
Should read:
-- identifying model corners predicted to be in a field of view of the mobile depth camera;
projecting the current depth map onto the 3D CAD model using the initial camera pose estimate to generate a projected depth map;
for each identified model corner, searching a surrounding area for corresponding corner candidates in the projected depth map;
selecting candidate corresponding corners according to a distance metric;
generating four point corner features from the model and the depth map; and
outputting the four point corner features. --

Signed and Sealed this  
Twenty-fourth Day of March, 2020

Andrei Iancu  
*Director of the United States Patent and Trademark Office*